United States Patent
Sikorski

[11] Patent Number: 5,470,747
[45] Date of Patent: Nov. 28, 1995

[54] SPHERICAL COMPOSTER

[76] Inventor: Joseph Sikorski, 26960 S. Lakeview Dr., Wauconda, Ill. 60084

[21] Appl. No.: 188,891

[22] Filed: Jan. 31, 1994

[51] Int. Cl.$^6$ .......................... C05F 11/06; C05F 17/02; C12N 1/10
[52] U.S. Cl. .................. 435/290.1; 220/4.21; 220/4.25; 220/908
[58] Field of Search ................ 220/200, 4.12, 220/4.21, 4.24, 4.25, 905, 315, 668, 669, 673, DIG. 13, 661; 435/287, 299, 813, 312, 316; 423/DIG. 18; 422/184

[56] References Cited

U.S. PATENT DOCUMENTS

| | | | |
|---|---|---|---|
| 521,501 | 6/1894 | Ireland | 220/673 |
| 3,335,902 | 8/1967 | Jovorik | 220/673 |
| 4,645,471 | 2/1987 | Herring et al. | 446/258 |
| 5,031,910 | 7/1991 | Kopp | 273/55 R |
| 5,152,414 | 10/1992 | Kruger | 220/4.33 |
| 5,234,833 | 8/1993 | Artis | 435/299 |

*Primary Examiner*—William H. Beisner
*Assistant Examiner*—Jane Williams
*Attorney, Agent, or Firm*—Paul H. Gallagher

[57] ABSTRACT

A sphere or globe of two hemispheric parts detachably secured together. One of the parts has a loading/unloading hole, and a cap snap-fitted in the hole to close it. Each part, except for the cap, is a one-piece molded article, and the cap is a one-piece molded article. The parts have ribs for strengthening and providing limited stability against rolling. The sphere can be rolled for stirring the contents therein, and for moving it to different locations.

4 Claims, 3 Drawing Sheets

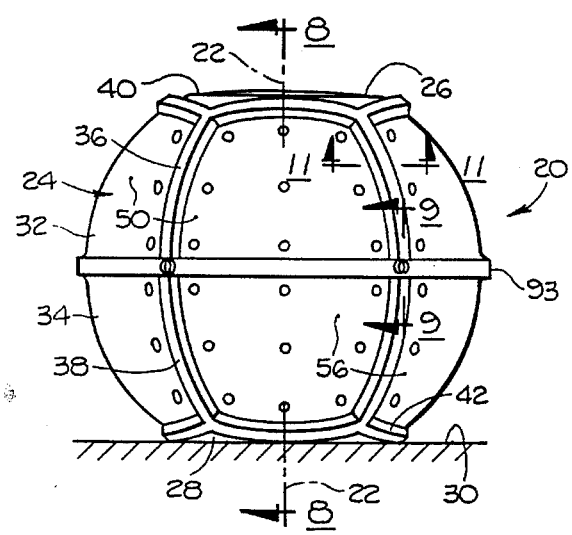
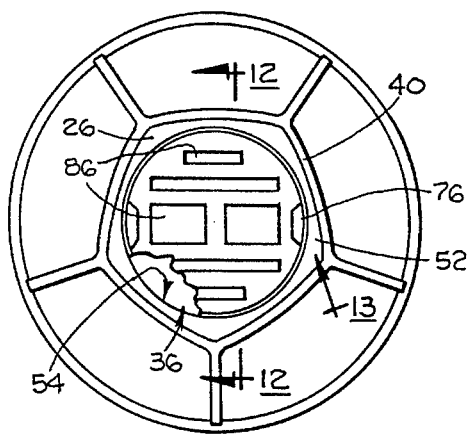
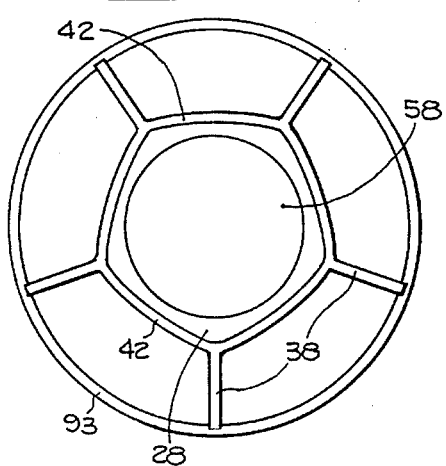
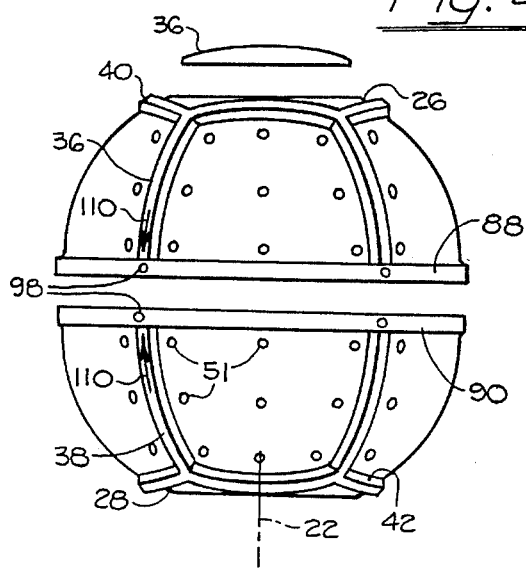
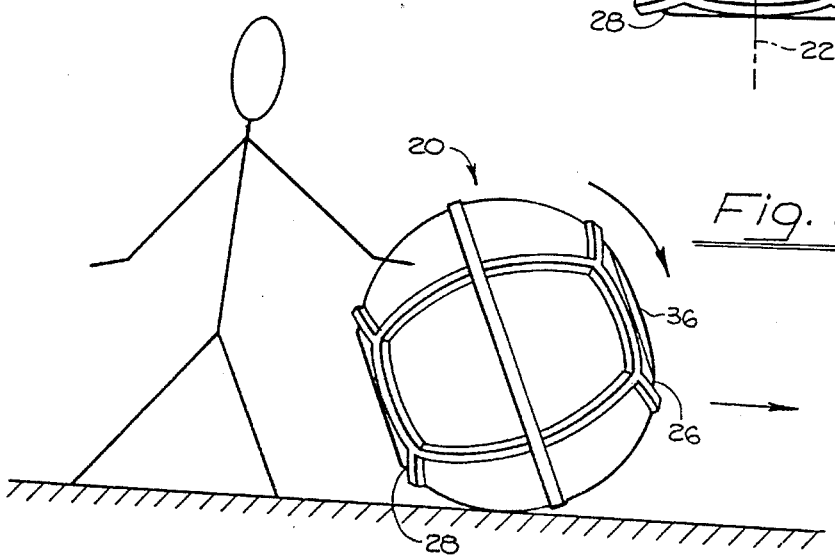

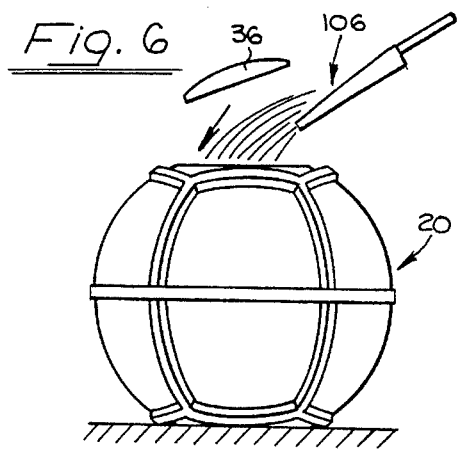
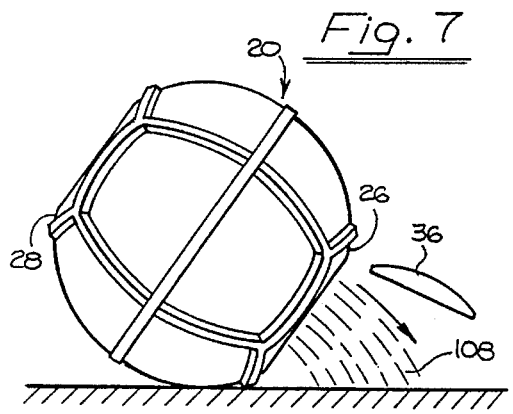
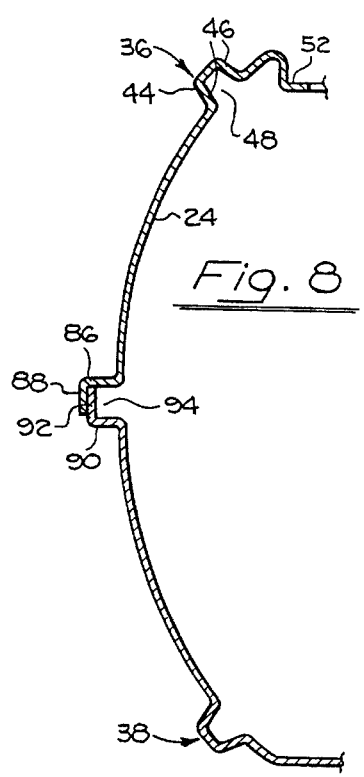
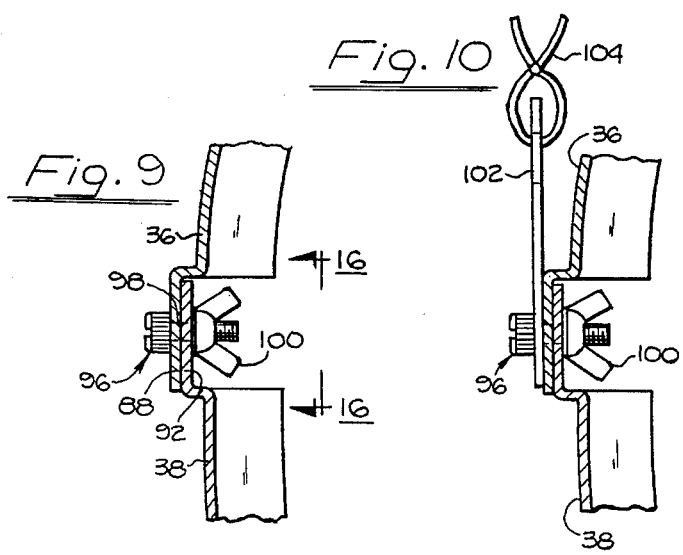
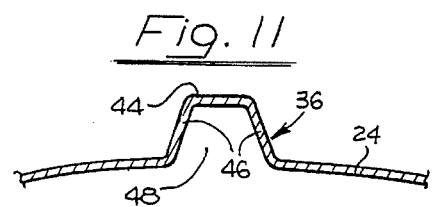
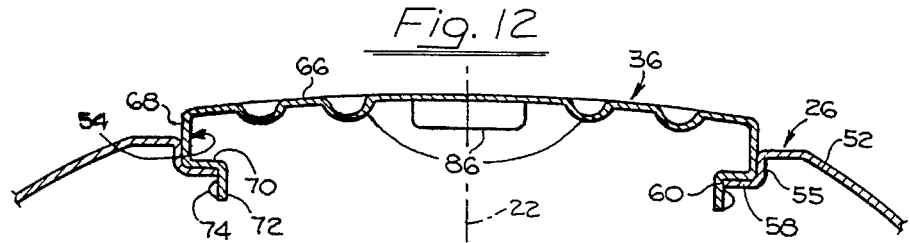

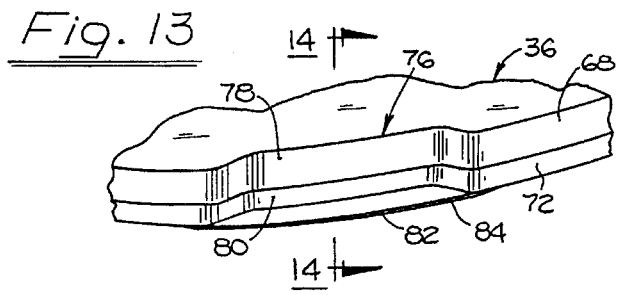
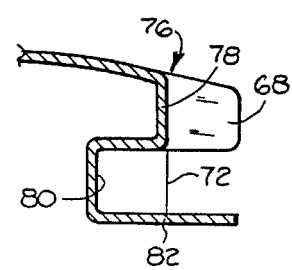
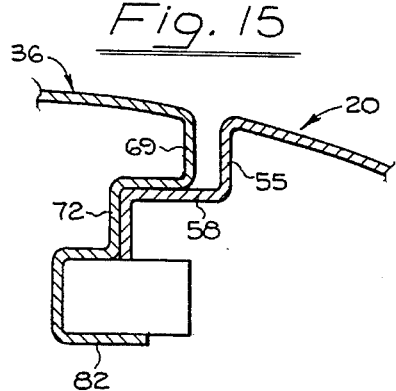
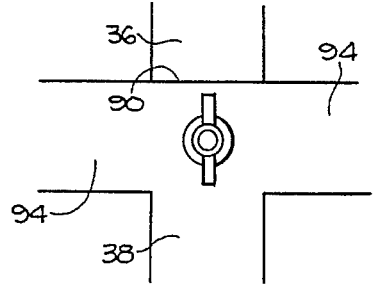

5,470,747

SPHERICAL COMPOSTER

FIELD OF THE INVENTION

The invention resides in the field of composters, for composting waste material. Such materials most commonly consist of grass clippings and various vegetable matter, and other matter that is subject to decomposing or degradation. In this general field, the general process is known, that is, such vegetable matter, with other matter such as humus or soil, is put in the composter which has ventilating holes, and in the process the material is stirred periodically, preferably every two or three days or oftener. Heretofore most composters where stationary, being retained in a single location, and in that sense considered fixed, that is, they were not moved about from place to place, generally.

INVENTIVE FEATURES OF THE PRESENT INVENTION

The composter of the present invention is of generally or nearly spherical form, and can be easily rolled. This rolling action provides two principal features—it stirs or mixes the material therein, enabling it to be so stirred or mixed easily, in the rolling action, and it can be easily relocated at different places, for facilitating loading and unloading of the material. Without this rolling action, and consequent movement about, the materials must be carried to and from the composter, which often times is at considerable distance, but the rolling action in the use of the present device, eliminates that carrying step, and enables the composter to be easily put in a position for filling it or emptying it.

A principal object therefore of the invention is to provide such a composter that is of generally spherical form.

Another object is to provide such a composter that is made up of parts or sections that are separable and capable of being secured together, facilitating handling of the composter as in shipping it, enabling the parts to be separated and fitted together in a compact manner.

Still another object is to provide such a composter, made up of a pair of hemispherical parts or sections, facilitating fabrication thereof, and rendering them inexpensive to manufacture.

Still another, and more specific object, is to provide a composter of the foregoing general nature, which is made up of two main parts, each of which is of one piece construction, and a third part constituting a cap for the loading hole, which is also of one-piece construction, facilitating the fabrication thereof, and reducing the cost thereof.

Yet another object is to provide a composter of the foregoing character, which is a molding, and preferably of plastic material, having a very thin wall, to conserve the amount of material used, and which is of special design providing unusual strength, to overcome any lack of strength that may result from the desired thin dimension of the wall.

BRIEF DESCRIPTION OF THE INDIVIDUAL FIGURES OF THE DRAWINGS

FIG. 1 is a side view of the composter.

FIG. 2 is a top view.

FIG. 3 is a bottom view.

FIG. 4 is a side view with the parts making up the composter, in separated and spaced positions.

FIG. 5 is a diagrammatic view showing the completed composter in rolling action.

FIG. 6 shows the composter in upright position and indicating a loading step.

FIG. 7 is a view of the composter in unloading position.

FIG. 8 is a sectional view taken at line 8—8 of FIG. 1 showing only the elements in the plane of the section line.

FIG. 9 is a fragmentary sectional view taken at line 9—9 of FIG. 1.

FIG. 10 is a fragmentary sectional view of certain elements of FIG. 9 together with a locking means and a tether.

FIG. 11 is sectional view taken at 11—11 of FIG. 1.

FIG. 12 is sectional view taken at line 12—12 of FIG. 2.

FIG. 13 is a fragmentary perspective view taken at approximately at the arrow 13 of FIG. 2.

FIG. 14 is a sectional view taken at line 14—14 of FIG. 13.

FIG. 15 is a view similar to FIG. 14 but including additionally, certain elements of the main part of the composter.

FIG. 16 is a view of a detail taken at line 16—16 of FIG. 9.

DETAILED DESCRIPTION

Referring in detail to the drawings, the composter is indicated in its entirety at 20, and in FIG. 1 it is shown in upright position, having a central axis 22. For convenience the references to the composter are relative to this position, unless otherwise indicated. The composter as a whole includes a surrounding wall 24 which is spherical in shape, with certain modifications referred to. The composter has a top surface or panel 26 and bottom surface or panel 28, both of which are flat, or nearly flat. In its orientation of FIG. 1, the bottom side rests on the ground 30, and in such position it is relatively stable as referred to again hereinbelow.

The composter as a whole is made up of two main parts or sections 32, 34, and a cap 36 (FIGS. 2,4) and these three parts make up the entire composter except for connecting means and a tie clip to be referred to hereinbelow.

The parts or sections 32, 34 are referred to for convenience as top and bottom parts respectively and both are very similar in shape and construction. Each part is provided with strengthening ribs 36, 38, respectively, extending longitudinally, relative to the axis 22. In addition to these axial strengthening ribs, the parts are provided with additional ribs 40, 42 at the top and bottom, surrounding the central axis, and respectively interconnected with the axial ribs. The ribs 40,42 are of pentagon shape and the axial ribs 36, 38 are five in number, connected to the ribs 40, 42 at the corners of the latter.

Each of the parts in the present case is made up of a continuous, one-piece construction and is preferably molded plastic. The entire article, of each part, is of substantially uniform thickness, including the wall elements of the ribs. The wall portion 24, of each part, has a spherical shape, and the ribs in thickness direction extend radially outwardly therefrom. This shape is shown best in FIGS. 8 and 11. The wall portion is shown at 24, and each rib 36, 38 has a radially outer element 44 and side elements 46. All of the ribs form radially inwardly opening channels 48. In each the upper part and lower part, each pair of adjacent axial ribs, together with the corresponding element of the rib 40, 42 surround a corresponding central area defining a small panel element 50

(FIG. 1) forming part of the spherical wall 24. The composter is provided with a plurality of ventilating holes 51.

The top surface 26 of the upper part is shown best in FIGS. 2, 8, and 12. This top surface includes a surrounding element 52 forming a continuation of the wall of the composter, and is provided with a hole 54 for loading and unloading material therethrough, and referred to as a loading hole for convenience. The marginal edge of the loading hole 54 (FIG. 12) is formed by an axially inwardly or downwardly extending cylindrical flange 55 at the bottom of which is an annular flange 58 extending substantially perpendicular to the main axis 22. This flange 58 has a radially inner edge 60 which forms the specific defining edge of the hole. The cap 36 is fitted in this hole as explained in detail hereinbelow.

The bottom part 34 is of construction similar to that of the part 32. In this case also, each two adjacent axial ribs together with the corresponding element of the rib 42 surround a small wall panel 56. When the two parts are fitted together, the axial ribs 36, 38 are in axial alignment, respectively.

The bottom panel 28, referred to above, is surrounded by the rib 42 and the central portion of the panel of the wall surrounded thereby is preferably flat as shown at 58, in FIGS. 1 and 3.

The cap 36 (FIG. 12) is releasably fitted in the hole 54, the cap including a main top element 66 having a surrounding down-turned flange 68 at the lower edge of which is an annular flange 70 directed radially inwardly, and at the inner end of the latter is an axially downwardly extending flange 72. On the outer surface of the flange 72 are a plurality of projections 74 distributed therearound, which releasably secure the cap in position as referred to hereinbelow. These projections may be for example twelve in number.

The cap is provided with a pair of handgrip notches 76 (FIGS. 2, 14) each of which includes an upper portion 78 formed in the flange 68 and a lower portion 80 formed in the flange 72. The lower portion 80 is defined at its bottom by a horizontal flange 82 having a radially outer edge 84 lying in the circle formed by the flange 72, whereby the lower notch portion 80 forms a socket for the fingers in grasping the cap. The cap is provided with strengthening ribs and indentations 86 (FIG. 2, 12) preferably directed downwardly.

The cap is fitted into place by inserting the lower element thereof, i.e. the flange 72, into the hole 54 in the composter and pressing downwardly, and snapping the projections 74 beyond the edge 60 of the flange 62 and the projections thereby releasably hold the cap in closing position. The cap is removed by grasping it by the hand in either of the notches 76 (FIG. 2) and pulling upwardly on it.

Each of the parts 32, 34 has an open end; in the top part, is a transverse flange 86 (FIG. 8) of annular shape, forming a ledge, and lying in a plane perpendicular to the axis. At the radially outer edge of this flange is a down-turned flange 88 of substantially cylindrical shape. On the bottom part, similarly, is a surrounding annular transverse flange 90 and an upturned cylindrical flange 92. On one of the parts, in this case the upper part, the horizontal flange 86 is of greater dimension than the corresponding element on the lower part, whereby the surrounding flange 88 fits over or radially beyond the flange 92. Preferably these elements are dimensioned that they fit snugly together, and the flange 92 may engage the ledge 86, for strengthening purposes. These flange elements together form a strengthening rib 93 (FIG. 1, 4) circumferentially around the composter at the equator thereof, which is essentially perpendicular to the axial ribs 36, 38, and the flanges 88, 92 form a double-thickness outer element of the rib 93. The transverse flanges 86, 90 extend outwardly from the skin of the wall of the composter, and they are dimensioned such that the flanges 88, 92 are near the radially outer edges of the axial flanges 36, 38 so that all of these elements together lie essentially in, or are close to, an outer spherical surface spaced outwardly from the surface 50 of the wall. This strengthening rib 93 forms a radially inwardly directed channel 94.

The two halves of the composter are fitted together with their open sides facing each other, and the rim elements 88, 92 fitted together as shown in FIG. 8. They are connected together by suitable bolts 96 (FIG. 9) inserted through holes 98 in the flange elements 88, 92, and nuts 100 are threaded on the inner ends of the bolts. The holes 98 may be located at the juncture of the ribs 36, 38, 94 (FIG. 16), the channels at the junctures providing greater space for accommodating the fingers in applying the nuts to the bolts. This is easily done by placing the bolts in the holes and reaching through the open top of the composter and applying the nuts. FIG. 10 shows a tether means for anchoring the composter to a fixed object to prevent its accidental rolling away. For this purpose a tie clip 102 is provided which is a simple piece of material, such as plastic or metal, and provided with a hole at one end by means of which it can be secured to the composter by the bolts/nuts 96, 100. At the other end is a hole for receiving a line or wire 104 that may be tied to a stake or fixed item. The bolts and nuts may be made of plastic, as well, and thus the whole composter is so made of plastic.

In the use of the composter, it is first filled with the material to be composted, as indicated at 106 in FIG. 6, after which the cap is of course applied. As is known, the composting material must be stirred and mixed, and heretofore, in stationary composters, to mix the material is was necessary to hand mix it, as by a shovel. In the present case to mix the material the composter is rolled as indicated in FIG. 5. The material should be mixed periodically, as often as every two, three days, and the capability of the composter being rolled, is a great advantage in this case. It takes only a matter of moments to so roll it, and the material is mixed throughout, i.e. all portions or increments are mixed in the rolling action.

The rolling action not only is a great advantage in the mixing step, but it is also a very great advantage in moving, as by carrying, the material to the location on the ground in which it is to be spread. In the use of the present composter, it is rolled to the position where the material is to be dumped and applied as fertilizer, and then tipped over to an emptying position as indicated in FIG. 7 wherein the material either falls out, or is pulled out, as indicated at 108. After the desired quantity is so emptied, the cap is again applied, and the composter rolled to another location. In consideration of the rolling action, it is desired of course that when the composter is not being used, and is put back in its intended inactive position, it not roll accidentally. The bottom surface of the composter is flat as indicated above, and this provides a substantial degree of stability. This is a feature to be considered in the case of winds, or on sloping ground. However, the flat surface at the bottom is not so extensive that the composter cannot easily be tipped over into a position in which the spherical surfaces engage the ground.

The positioning of the axial ribs 36, 38 and their spacing, are such that when it is desired to locate the composter in a certain position other than on the flat bottom, the corresponding elements of the ribs, 42, 38, 88, or some of them, engage the ground, as in FIG. 7, and provide a degree of stability for the unloading step. This stability is achieved by the static condition of the composter, but it is not so great as to seriously impede the rolling action after that action begins. Together with this feature, is the feature that all of the strengthening ribs, including the circumferential rib, lie close to a common spherical surface facilitating the rolling action in substantially any and all directions.

Indicator marks 110 (FIG. 4) may be applied to the parts for facilitating registering the parts in fitting them together.

I claim:

1. A spherical composter, comprising a composter which is spherical in shape and of relatively large size enabling rolling said composter by a user who is in a standing position, said composter accommodating a great mass of compost, the composter having a central axis and including two main parts, namely a bottom part and a top pard, both hemispherical in shape, and each including a wall element, the bottom part being of one-piece construction and constituting a complete hemisphere, the top part including a surrounding piece with a hole therein and a cover snap-fitted in the hole, the surrounding piece and cover constituting a complete hemisphere, the bottom part and the top part being made up entirely of molded material, the main parts having open sides of circular shape lying in a plane perpendicular to said central axis, and each part terminating in a continuous equatorial rim surrounding its open side and including an annular flange extending radially outwardly from the wall element of the part and a cylindrical flange at the radially outer edge of the annular flange and extending axially away from the wall element, the cylindrical flanges being of slightly different diameter to enable telescoping thereof, the main parts being capable of being fitted together with their open sides interfacing and the cylindrical flanges telescoped, and the smaller cylindrical flange engaging the annular flange on the other part, and connector means detachably extending radially through the telescoped cylindrical flanges at positions distributed circumferentially around the composter, and operable for securing the parts together, said connector means constituting the only means for securing the parts together, the interengaging flanges of the equatorial rims and the connector means together also forming an oquatorial strengthening rib, extending radially outwardly beyond the wall elements.

2. A spherical composter according to claim 1 wherein, the hole in the top part is concentric with said axis, and the top part includes a continuous strengthening rib surrounding the hole in close proximity thereto, and extending radially outwardly beyond the wall element.

3. A spherical composter according to claim 2 wherein, the bottom part includes a continuous surrounding strengthening rib similar in size to and axially aligned with the rib surrounding the hole in the top par, and extending radially outwardly beyond the wall element, and the parts also including strengthening ribs lying in radial/axial planes also extending radially outwardly beyond the respective wall elements and extending between and merging continuously with said surrounding strengthening ribs and the equatorial strengthening rib, said radial/axial ribs and said surrounding ribs being of a radial extent not greater than that of the equatorial strengthening rib.

4. A spherical composter according to claim 3, wherein the bottom part and the top part are each of thin-wall construction throughout, said surrounding strengthening ribs and the radial/axial strengthening ribs are hollow with open sides opening radially inwardly and being of wall thickness substantially equal to that of the wall elements.

\* \* \* \* \*